US010754897B2

(12) United States Patent
Ho et al.

(10) Patent No.: US 10,754,897 B2
(45) **Date of Patent: *Aug. 25, 2020**

(54) SEARCH ENGINE DOMAIN TRANSFER

(71) Applicant: International Business Machines Corporation, Armonk, NY (US)

(72) Inventors: Tin K. Ho, Millburn, NJ (US); Luis A. Lastras-Montano, Cortlandt Manor, NY (US); Vinith Misra, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 1371 days.

This patent is subject to a terminal disclaimer.

(21) Appl. No.: 14/863,959

(22) Filed: Sep. 24, 2015

(65) Prior Publication Data

US 2017/0068737 A1 Mar. 9, 2017

Related U.S. Application Data

(63) Continuation of application No. 14/848,814, filed on Sep. 9, 2015.

(51) Int. Cl.
*G06F 16/951* (2019.01)
*G06F 16/248* (2019.01)
(Continued)

(52) U.S. Cl.
CPC .......... *G06F 16/951* (2019.01); *G06F 16/248* (2019.01); *G06F 16/24575* (2019.01); *G06F 16/24578* (2019.01); *G06F 16/9535* (2019.01)

(58) Field of Classification Search
None
See application file for complete search history.

(56) References Cited

U.S. PATENT DOCUMENTS 5,619,709 A * 4/1997 Caid .................... G06F 16/58 715/209
7,856,441 B1 * 12/2010 Kraft .................... G06F 16/951 707/758

(Continued)

FOREIGN PATENT DOCUMENTS

WO WO02015/028898 A1 3/2015

OTHER PUBLICATIONS

Aldape-Perez et al. "Feature Selection using a Hybrid Associative Classifier with Masking Techniques". Proceedings of the Fifth MICAI. Nov. 2006. DOI: 10.1109/MICAI.2006.15. URL Link: <https://ieeexplore.ieee.org/stamp/stamp.jsp?tp=&arnumber=4022148>. Accessed Feb. 2019. (Year: 2006).*

(Continued)

*Primary Examiner* — Neveen Abel Jalil
*Assistant Examiner* — Irene Baker
(74) *Attorney, Agent, or Firm* — Stephen J. Walder, Jr.; Stephen R. Tkacs; Diana R. Gerhardt

(57) ABSTRACT

A mechanism is provided for search engine domain transfer. The mechanism receives an input query to search a specialized domain from a user and performs a general-domain search based on the input query to generate a set of general-domain results. The mechanism generates a feature vector based on the general-domain results and generates a score for each document within the specialized domain based on the feature vector. The mechanism generates a ranked result set of documents based on the scores of the documents in the specialized domain and presents the ranked result set to the user.

7 Claims, 4 Drawing Sheets

(51) Int. Cl.
*G06F 16/9535* (2019.01)
*G06F 16/2457* (2019.01)

(56) References Cited

U.S. PATENT DOCUMENTS

| | | | | |
|---|---|---|---|---|
| 8,645,394 | B1 | 2/2014 | Kolak et al. | |
| 2001/0013035 | A1 | 8/2001 | Cohen | |
| 2005/0228788 | A1* | 10/2005 | Dahn | G06F 16/3332 |
| 2006/0085399 | A1* | 4/2006 | Carmel | G06F 16/951 |
| 2007/0067281 | A1* | 3/2007 | Matveeva | G06F 16/334 |
| 2008/0101689 | A1* | 5/2008 | Forman | G06K 9/623 382/159 |
| 2008/0235209 | A1* | 9/2008 | Rathod | G06F 16/3325 |
| 2008/0243838 | A1* | 10/2008 | Scott | G06F 16/951 |
| 2009/0024607 | A1* | 1/2009 | Sun | G06F 16/334 |
| 2010/0114933 | A1* | 5/2010 | Murdock | G06F 16/58 707/765 |
| 2011/0153577 | A1* | 6/2011 | Dean | G06F 16/951 707/693 |
| 2012/0033861 | A1* | 2/2012 | Dai | G06K 9/6254 382/128 |
| 2013/0290342 | A1 | 10/2013 | Cooper et al. | |
| 2013/0311166 | A1 | 11/2013 | Yanpolsky | |
| 2015/0293976 | A1* | 10/2015 | Guo | G06F 16/248 707/706 |
| 2016/0070731 | A1* | 3/2016 | Chang | G06Q 30/00 707/741 |

OTHER PUBLICATIONS

Opitz et al. "Popular Ensemble Methods: An Empirical Study". Journal of Artificial Intelligence Research 11 (1999) 169-198. URL Link: https://www.d.umn.edu/~rmaclin/publications/opitz-jair99.pdf. Accessed Jun. 2018. Published Aug. 1999. (Year: 1999).*

Wikipedia. "Feature selection". URL Link: https://en.wikipedia.org/wiki/Feature_selection. Accessed Jun. 2018. Archive.org snapshot on Aug. 19, 2015. (Year: 2015).*

Wikipedia. "Learning to rank". URL Link: https://en.wikipedia.org/wiki/Learning_to_rank. Accessed Jun. 2018. Archive.org snapshot on Jul. 11, 2015. (Year: 2015).*

Wikipedia. "Parallel Computing". URL Link: https://en.wikipedia.org/wiki/Parallel_computing. Accessed Jun. 2018. Archive.org snapshot on Aug. 18, 2015. (Year: 2015).*

Barney. "Introduction to Parallel Computing". URL Link: https://computing.llnl.gov/tutorials/parallel_comp/. Accessed Feb. 2017. Archive.org snapshot on Dec. 5, 2014. (Year: 2014).*

Stata. "Parallel programming in modern web search engines". Proceedings of the eleventh ACM SIGPLAN symposium on Principles and practice of parallel programming. DOI 10.1145/1122971.1122973. URL Link: https://dl.acm.org/citation.cfm?id=1122973. Accessed Jun. 2018. Published Mar. 2006. (Year: 2006).*

"Feature Selection", Wikipedia, URL Link: https://en.wikipedia.org/wiki/Feature_selection. Archive.org snapshot on Aug. 19, 2015, Accessed Jun. 2018, 12 pages.

"Learning to rank", URL Link: https://en.wikipedia.org/wiki/Learning_to_rank, accessed Jun. 2018, archive.org snapshot on Jul. 11, 2015, 7 pages.

"Parallel Computing", URL Link: https://en.wikipedia.org/wiki/Parallel_computing.Archive.org snapshot on Aug. 18, 2015, Accessed Jun. 2018, 19 pages.

Barney, Blaise "Introduction to Parallel Computing", URL Link: https://computing.llnl.gov/tutorials/parallel_comp/. Accessed Feb. 2017. Archive.org snapshot on Dec. 5, 2014, 37 pages.

Beel, Joeran et al., "Research-paper recommender systems: a literature survey", Int J Digit Lib (2016) 17:305-338, DOI 10.1007/s00799-015-0156-0, URL Link: https://link.springer.com/content/pdf/10.1007%2Fs00799-015-0156-0.pdf, Published Jul. 26, 2015, Accessed Jun. 2018, 34 pages.

Opitz, David et al., "Popular Ensemble Methods: An Empirical Study", Journal of Artificial Intelligence Research 11 (1999), URL Link https://www.d.umn.edu/~rmaclin/publications/opitz-jair99.pdf, Published Aug. 1999, Accessed Jun. 2018, pp. 169-198.

Stata, Raymie "Parallel Programming in Modern Web Search Engines", Proceedings of the eleventh ACM SIGPLAN symposium on Principles and practice of parallel programming. DOI 10.1145/1122971.1122973, URL Link: https://di.acm.org/citation.cfm?id=1122973 Published Mar. 2006, Accessed Jun. 2018, 1 page.

"Autocomplete", Google, https://support.google.com/customsearch/answer/2631081?hl=en, retrieved from the internet Jun. 16, 2015, 3 pages.

"How much does the U.S. president get paid?", HowStuffWorks, http://money.howstuffworks.com/question449.htm, Aug. 21, 2000, 2 pages.

"President of the United States", Wikipedia, https://en.wikipedia.org/wiki/President_of_the_United_States, retrieved from the Internet Jun. 16, 2015, 26 pages.

"Salaries and Retirement Benefits of U.S. Presidents and Other Federal Government Employees", ipl2, http://www.ipl.org/div/farq/pensionFARQ.html, retrieved from the Internet Jun. 16, 215, 3 pages.

"Salaries of the President, Vice President, and Other U.S. Officials", Information Please Database, http://www.infoplease.com/ipa/A0875856.html, retrieved from the Internet Jun. 16, 2015, 1 page.

Allen, Ashley C. , "Report: The 10 richest U.S. presidents", http://www.usatoday.com/story/money/business/2014/02/15/10-richest-presidents/5514567/, Feb. 17, 2014, 6 pages.

Bollegala, Danushka et al., "Measuring Semantic Similarity between Words Using Web Search Engines", WWW 2007, May 8-12, 2007, pp. 757-766.

Cilibrasi, Rudi L. et al., "The Google Similarity Distance", IEEE Transactions on Knowledge and Data Engineering, vol. 19, No. 3, Mar. 2007, pp. 370-383.

Costa, Kim, "Infographic: Just how much money does the president make?", http://www.snagajob.com/resources/infographic-just-how-much-money-does-the-president-make/, Feb. 17, 2014, 8 pages.

Keiler, Brianna, "Being ex-president can be lucrative gig", http://www.cnn.com/2012/01/27/politics/pays-to-be-president/, Feb. 27, 2012, 6 pages.

Mccallum, Andrew et al., "A Machine Learning Approach to Building Domain-Specific Search Engines", Proceedings of the 16th International Joint Conference on Artificial Intelligence (IJCAI'99), vol. 2, Jul. 31, 1999, pp. 662-667.

Metzler, Donald et al., "Similarity Measures for Short Segments of Text", http://link.springer.com/chapter/10.1007/978-3-540-71496-5_5, Lecture Notes in Computer Science, vol. 4425, Chapter 5, Apr. 2-5, 2007, 12 pages.

Sahami, Mehran et al., "A Web-based Kernel Function for Measuring the Similarity of Short Text Snippets", World Wide Web Conference Committee, http://www2006.org/programme/files/xhtml/3069/3069-sahami/3069-sahami-xhtml.html, WWW 2006, May 23-26, 2006, 20 pages.

Warner, Brian, "How Much Does the President Make?", http://www.celebritynetworth.com/articles/entertainment-articles/how-much-money-does-the-president-make/, retrieved from the Internet Jun. 16, 2015, 4 pages.

Warner, Brian, "How Much is Barack Obama Worth?", http://www.celebritynetworth.com/richest-politicians/presidents/barack-obama-net-worth/, retrieved from the Internet Jun. 16, 2015, 14 pages.

Warner, Brian, "How Much Money Did Barack Obama Make in 2013?", http://www.celebritynetworth.com/articles/how-much-does/much-money-barack-obama-make-2013/, Apr. 13, 2014, 4 pages.

Wesley, Daniel, "The Presidential Paycheck—Where Obama Gets His Money", http://visualeconomics.creditloan.com/the-presidential-paycheck-where-obama-gets-his-money/, retrieved from the Internet Jun. 16, 2015, 12 pages.

Yih, Wen-Tau et al., "Improving Similarity Measures for Short Segments of Text", Association for the Advancement of Artificial Intelligence, vol. 7, No. 7, Jul. 22, 2007, pp. 1489-1494.

List of IBM Patents or Patent Applications Treated as Related dated Sep. 24, 2015, 2 pages.

* cited by examiner

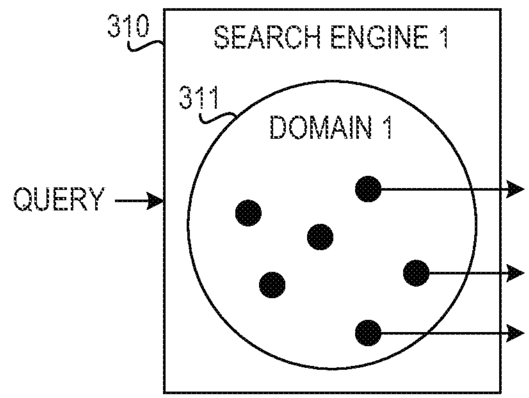
*FIG. 3A*
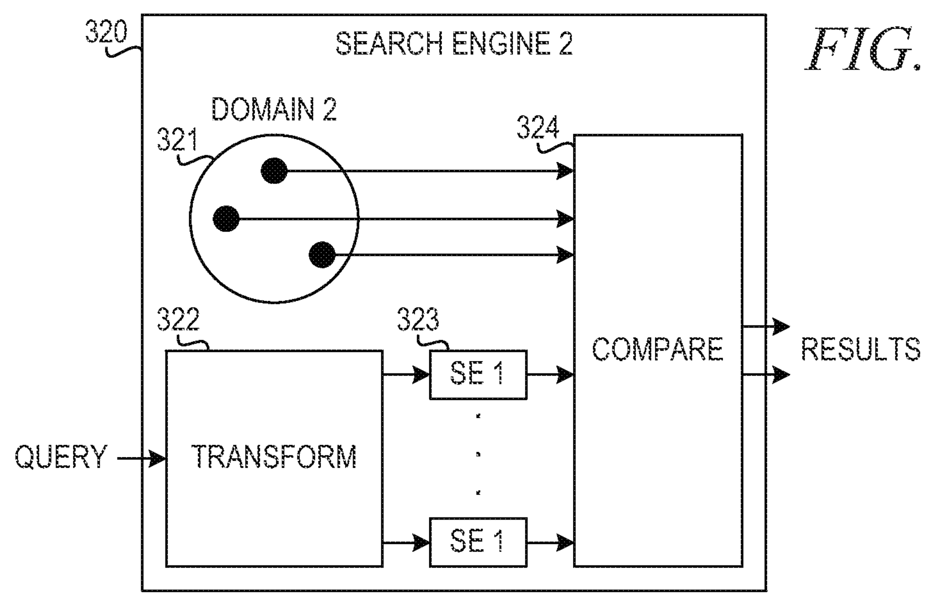
*FIG. 3B*
*FIG. 4*
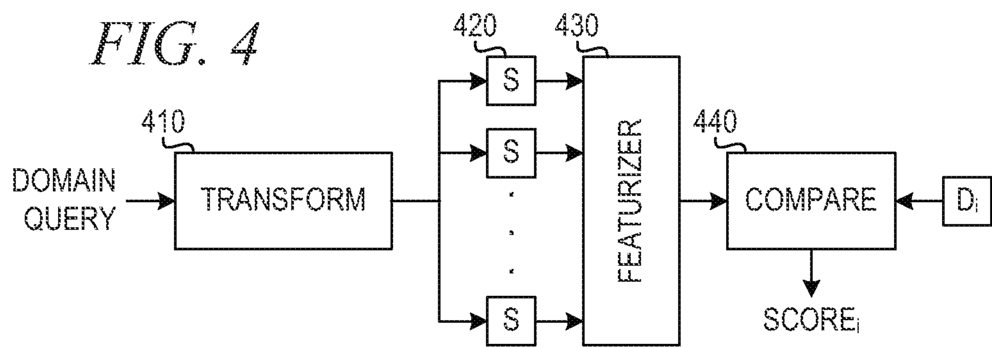

SEARCH ENGINE DOMAIN TRANSFER

BACKGROUND

The present application relates generally to an improved data processing apparatus and method and more specifically to mechanisms for search engine domain transfer.

Web search engines work by storing information about many web pages, which they retrieve from the hypertext markup language (HTML) markup of the pages. A Web crawler retrieves these pages and follows every link on the site. The search engine then analyzes the contents of each page to determine how it should be indexed (for example, words can be extracted from the titles, page content, headings, or special fields called meta tags). A Web search engine stores data about web pages in an index database for use in later queries. A query from a user can be a single word. The index helps find information relating to the query as quickly as possible. Some search engines store all or part of the source page (referred to as a cache) as as information about the web pages, whereas others store every word of every page they find. This cached page always holds the actual search text since it is the one that was actually indexed, so it can be very useful when the content of the current page has been updated and the search terms are no longer in it.

When a user enters a query into a search engine (typically by using keywords), the engine examines its index and provides a listing of best-matching web pages according to its criteria, usually with a short summary containing the document's title and sometimes parts of the text. The index is built from the information stored with the data and the method by which the information is indexed. Most search engines support the use of the Boolean operators AND, OR and NOT to further specify the search query. Boolean operators are for literal searches that allow the user to refine and extend the terms of the search. The engine looks for the words or phrases exactly as entered. Some search engines provide an advanced feature called proximity search, which allows users to define the distance between keywords.

The usefulness of a search engine depends on the relevance of the result set it gives back. While there may be millions of web pages that include a particular word or phrase, some pages may be more relevant, popular, or authoritative than others. Most search engines employ methods to rank the results to provide the "best" results first. How a search engine decides which pages are the best matches, and what order the results should be shown in, varies widely from one engine to another. The methods also change over time as Internet usage changes and new techniques evolve. There are two main types of search engine that have evolved: one is a system of predefined and hierarchically ordered keywords that humans have programmed extensively. The other is a system that generates an "inverted index" by analyzing texts it locates. This form relies much more heavily on the computer itself to do the bulk of the work.

SUMMARY

In one illustrative embodiment, a method, in a data processing system, is provided for search engine domain transfer. The method comprises receiving an input query to search a specialized domain from a user and performing at least one general-domain search based on the input query to generate a set of general-domain results. The method further comprises generating a feature vector based on the general-domain results and generating a score for each document within the specialized domain based on the feature vector. The method further comprises generating a ranked result set of documents based on the scores of the documents in the specialized domain and presenting the ranked result set to the user.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of the operations outlined above with regard to the method illustrative embodiment.

These and other features and advantages of the present invention will be described in or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 3A and 3B illustrate search engine domain transfer in accordance with an illustrative embodiment;

FIG. 4 is a block diagram illustrating a search engine with domain transfer in accordance with an illustrative embodiment;

DETAILED DESCRIPTION

Figure 1:
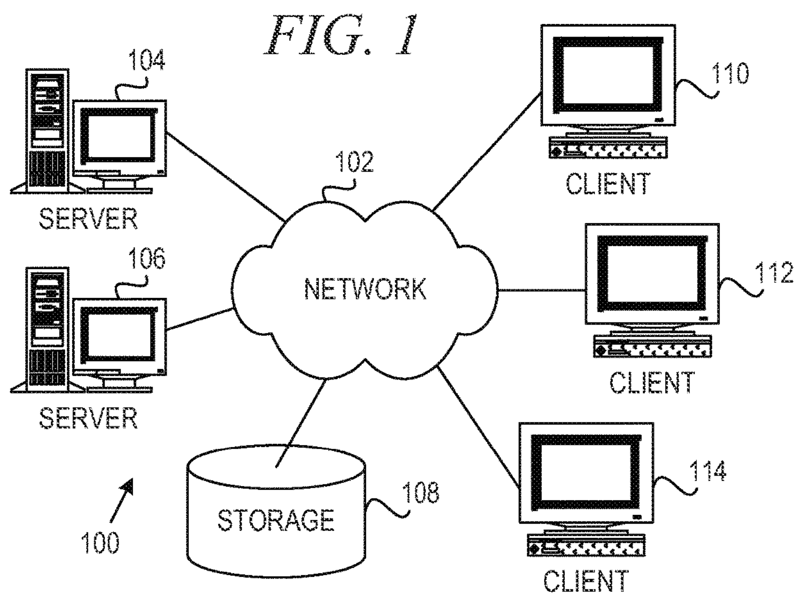
FIG. 1 is an example diagram of a distributed data processing system in which aspects of the illustrative embodiments may be implemented.

A search engine takes a text query from a user and retrieves a list of documents from a corpus, ranked by their relevance to the query. The broad domain of information retrieval seeks to optimize the method of producing such a ranked list. Tremendous advances have been made in this field over the past decades, particularly by Internet search engines, such as Google, Bing, and Baidu. By leveraging a tremendous amount of data and highly optimized algorithms, these search engines are today capable of interpreting the "intent" users have behind their queries, which are frequently written in natural language.

Current performance of Web search engines is due to two sources of data: a massive corpus of hyperlinked documents (the Internet) and logs of user behavior at large scale and fine resolution. While the first source of data proves extremely valuable to traditional information retrieval algorithms (e.g., PageRank), the user query logs are responsible for much of the recent improvements in the relevancy of Web search results.

The illustrative embodiments provide mechanisms for search engine domain transfer that focus not on Web search but rather on vertical search, i.e., enterprise search or domain-specific search. Here, the search engine is designed for a specific domain or application (e.g., searching through a user's email or through a company's website). These custom search engines have generally struggled to match the performance of general Web search. This is due to a relative paucity of data: both the document corpora and user behavior logs are generally orders of magnitude smaller in domain applications.

The mechanisms of the illustrative embodiments allow one to leverage a highly-optimized wide-domain search engine in order to retrieve information from a smaller domain.

There has been a healthy amount of work in the area of vertical search, but this work fails to use broad-domain knowledge or data to power domain-specific search. Part of the reason is that domain-specificity encourages highly optimized domain-specific rules.

Google offers a custom search service for websites allowing users to search the website's domain. There is an option to enable Google Custom Search to retrieve both Internet documents and site-specific documents. There is no documented or observable effect where the wide-domain search features somehow improve the quality of the site-specific results, with the exception of the autocomplete functionality. This autocomplete functionality can autocomplete custom search queries based on general-domain user behavior but does not affect functionality beyond query formation. Furthermore, autocomplete functionality is only available when a user has selected to search both a custom domain and the Internet at the same time, and it is unclear if it is even being leveraged with the intention of improving custom search performance.

In accordance with the illustrative embodiments, a search engine featurizes search engine results from a wide-domain search in an efficient manner and applies a resulting feature vector to the task of query retrieval within a more specific domain.

Before beginning the discussion of the various aspects of the illustrative embodiments it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments, it should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of the examples provided herein without departing from the spirit and scope of the present invention.

Figure 2:
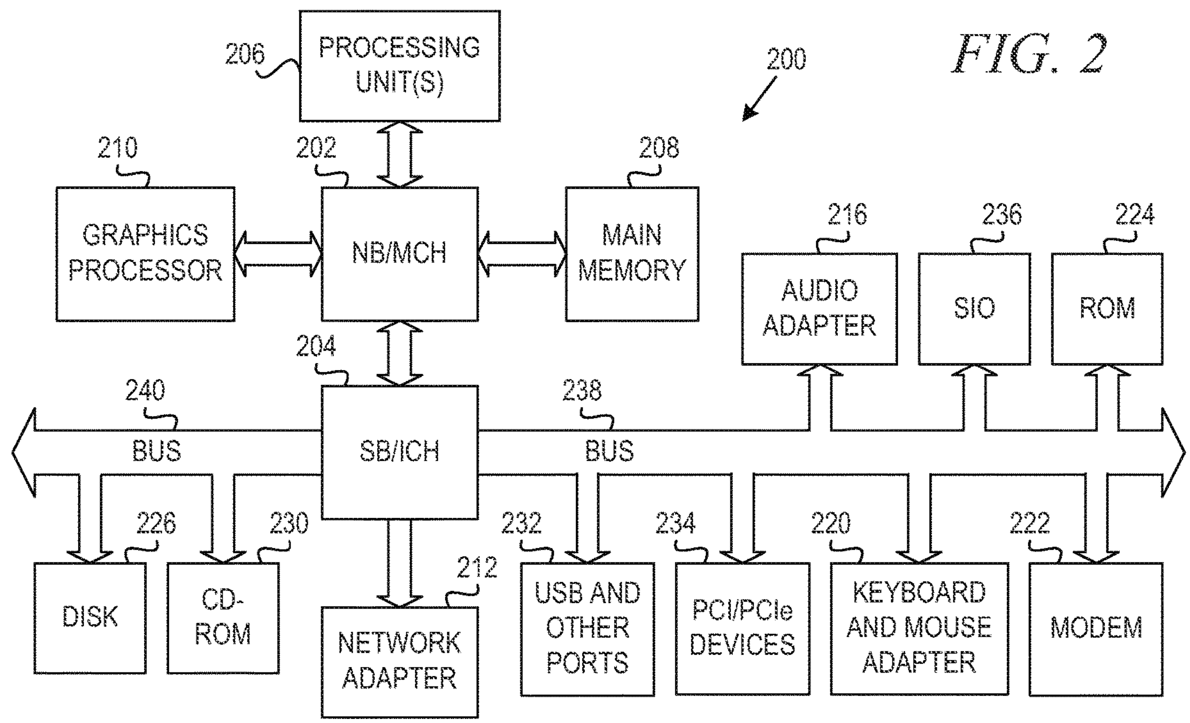
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a search engine with domain transfer. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates search engine domain transfer.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206, The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to search engine domain transfer.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

The illustrative embodiments provide mechanisms to return a ranked list of domain-specific documents in response to a query. FIGS. 3A and 3B illustrate search engine domain transfer in accordance with an illustrative embodiment. With reference to FIG. 3A, search engine 1 310 receives a query and identifies documents in domain 1 311 that satisfy the query. Search engine 1 310 is indexed for domain 1 311. In the depicted example, domain 311 may be a massive corpus hyperlinked documents (e.g., the Internet). Search engine 1 310 may use logs of user behavior at large scale and fine resolution.

Turning to FIG. 3B, search engine 2 320 receives a query for domain 2 321. Transform 322 transforms the query into multiple queries for search engine 1 (SE 1) 323. Each instance of SE 1 323 searches a general corpus of documents, such as domain 1 311 in FIG. 3A, using a respective one of the multiple queries. Compare component 324 compares the results from SE 1 323 to the documents in domain 2 321 to generate results.

FIG. 4 is a block diagram illustrating a search engine with domain transfer in accordance with an illustrative embodiment. Transform component 410 receives a narrow-domain query and transforms the query into a plurality of general-domain queries. Transform component 410 consists of a plurality of transformation functions, and each transformation function produces a corresponding general-domain query from the narrow-domain query. The transformation functions may be as simple as passing the query through unmodified or as complex as performing translation into a general-domain language and filtering out unnecessary words via syntactic analysis. The transformation functions described herein are exemplary, and more or fewer transformation functions may be implemented within the spirit and scope of the illustrative embodiments.

Each of the plurality of general-domain search engine instances (S) 420 receives a respective general-domain query. Each general-domain search engine instance 420 returns results in the form of a ranked list of documents, including content. For example, for each document in the ranked list, the content may include a title, an excerpt, a host name, at least one uniform resource locator (URL), and the document itself.

Each general-domain search engine instance 420 may run on the same machine. For example, general-domain search engine instances 420 may execute within virtual machines on the same server in parallel. Alternatively, each general-domain search engine instance 420 may run on a separate server. In one embodiment, the mechanism of the illustrative embodiment sends the general-domain queries to an external search engine in parallel.

Featurizer 430 receives results from each general-domain search engine instance 420 and extracts a feature vector that represents the user's query in the general domain.

Compare component 440 compares the feature vector from featurizer 430 to each document $D_i$ in the narrow domain. Compare component 440 then generates a quantitative score for the narrow domain query with each document based on the general-domain feature vector. There is considerable flexibility available for selection of a scoring function. The search engine then returns the documents to the user sorted by the quantitative score.

Figure 5:
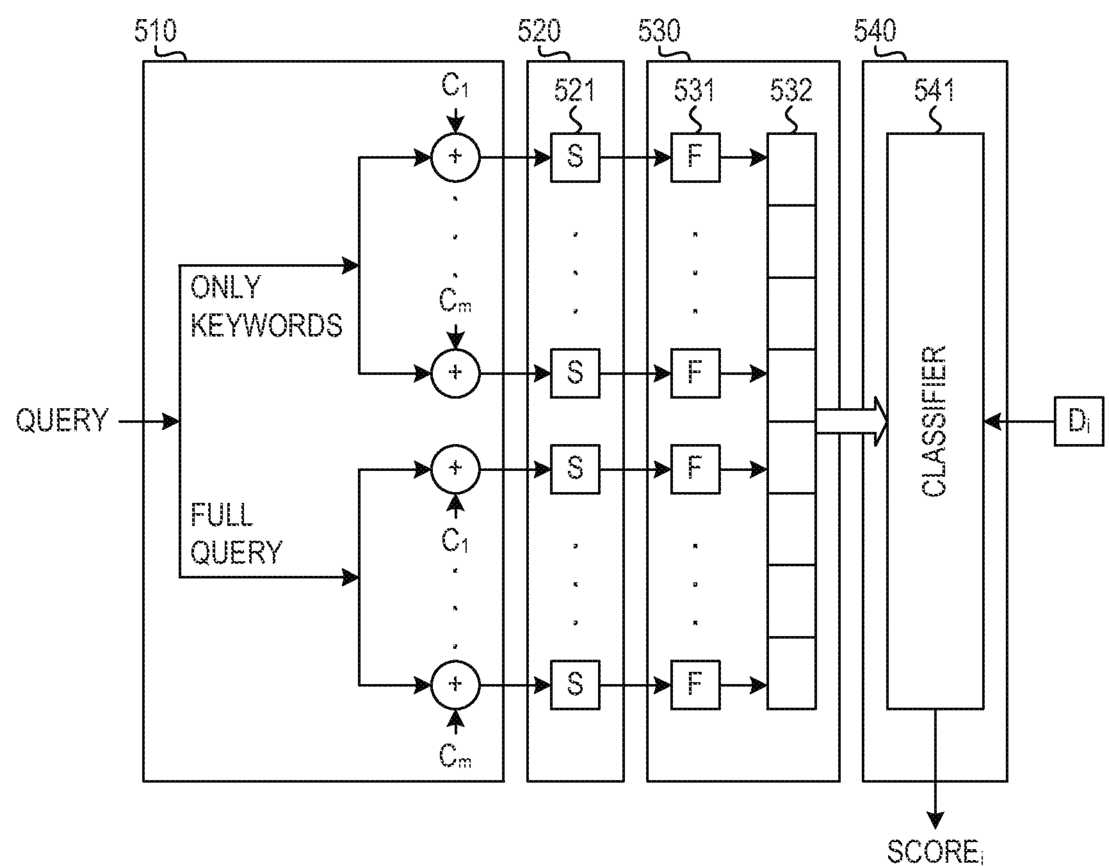
FIG. 5 is a block diagram illustrating query transformation for search engine domain transfer in accordance with an illustrative embodiment.

FIG. 5 is a block diagram illustrating query transformation for search engine domain transfer in accordance with an illustrative embodiment. In the illustrative embodiment, training data are available in the form of training queries with ground truth labels. Each label is a document from the domain corpus that is most relevant to the query.

Transformation block 510 consists of two stages. First the transformation block 510 splits the query into two versions: the original query and a version consisting of only the "keywords" from the query. In one embodiment, the transformation block 510 filters the keywords based on parts-of-speech tags assigned to each word: nouns, verbs, adjectives, most adverbs, and wh-qualifiers/determiners/adverbs.

In the second stage, transformation block 510 contextualizes the resulting queries by the addition of context strings. For instance, the domain relevant to veterans of the United States military might choose the following context strings: " ", "Veteran", "Military", "VA". Transformation block 510 transforms each query into a plurality of general-domain queries by concatenating the relevant context.

To illustrate, suppose the original query was given by, "Health care coverage is okay." The keyword-distilled version would then be, "Health care coverage okay." According to the above United States military context, the transformed queries would be as follows:

"Health care coverage is okay"
"Veteran Health care coverage is okay"
"Military Health care coverage is okay"
"VA Health care coverage is okay"
"Health care coverage okay"
"Veteran Health care coverage okay"
"Military Health care coverage okay"
"VA Health care coverage okay"

These are cumulatively referred to as the transformed queries or the general-domain queries.

In general-domain search block 520, each transformed query is independently passed to a general-domain search engine instance 521. Each general-domain search engine 521 returns a ranked list of documents, including document title, excerpt, etc., for a corresponding general-domain query. The recall of this list can generally be as large as desired. In one example embodiment, a recall of 100 documents is more than sufficient. General-domain search block 520 passes these results to featurizer block 530.

There may be many ways to featurize lists of results. In one simple example, each featurizer 531 concatenates titles and excerpts (also referred to as "snippets") and vectorizes via term-frequency-inverse-document-frequency (TF-IDF). To compare the inverse document frequencies, featurizer block 530 assumes that a collection of queries are being passed through the system in batch.

1. For each general-domain query, featurizer block 530 concatenates the titles and snippets (with spacing) into a single long text string.

2. The featurizer block 530 then collects the concatenated text string for each general-domain query for a large collection of queries and composes a list of strings.

3. The featurizer block 530 then applies TF-IDF to each concatenated string described as a bag of words, computes term frequency (TF) for each concatenated string, and computes inverse document frequency (IDF) across the collection of concatenated strings.

This process produces a vector for each transformation. Featurizer block 530 generates a feature vector 532 as the concatenation of these vectors. Featurizer block 530 then passes the feature vector 532 to comparison block 540.

The comparison block 540 computes a similarity score based on feature vector 532 and each document $D_i$ in the narrow domain. In one embodiment, classifier 541 is a machine learning classifier trained with supervision to produce appropriate scores. More specifically, assuming that a set of training queries and corresponding ground truth document labels, for each possible document label, a one-versus-rest classifier is trained to predict whether an input feature vector has a given label. When a new query appears, classifier 541 uses the score from each document's classifier to rank the documents. Supervision is not necessary for comparison block 540; however, in accordance with the example embodiment, a supervised machine learning classifier improves performance.

In the above, the feature vector 532 consists solely of search-engine-domain-transfer components, and comparison block 540 uses the entire concatenated vector to train classifier 541. In addition, the sub-vectors corresponding to different forms of the query (restricted to each specific context or keyword distilled) provide a set of partially correlated characterizations of the original query with different sets of features masked off. Each sub-vector can be used to train classifier 541. The entire set of classifiers could then be used in an ensemble learning scheme, which could reduce the risk of overfitting and yield improved accuracy on unseen data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
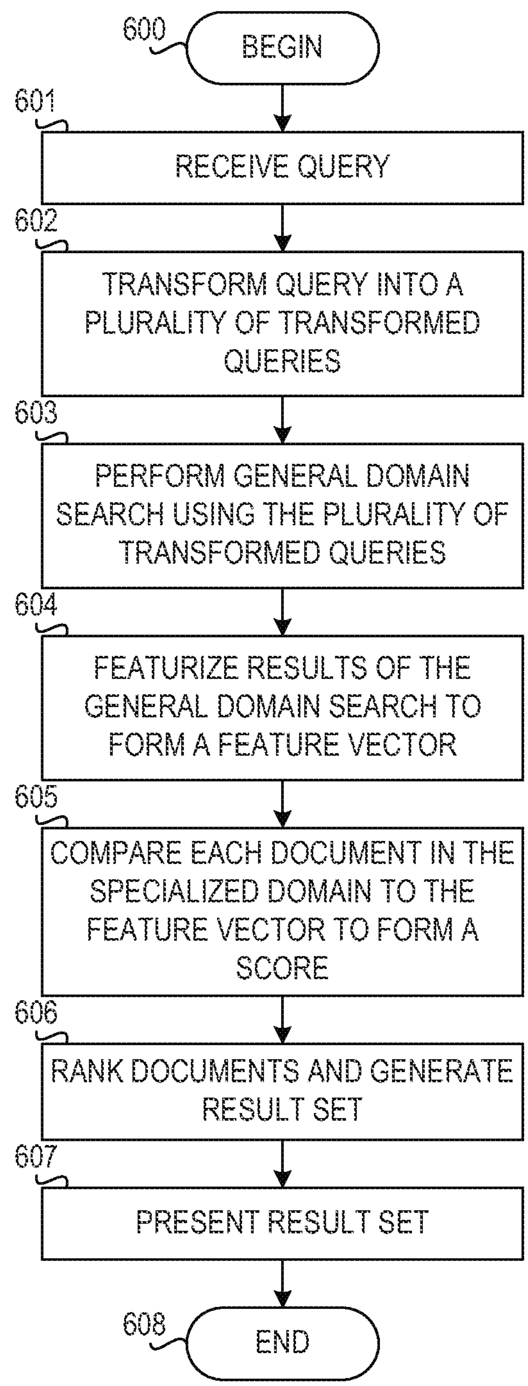
FIG. 6 is a flowchart illustrating operation of a mechanism for search engine domain transfer in accordance with an illustrative embodiment.

FIG. 6 is a flowchart illustrating operation of a mechanism for search engine domain transfer in accordance with an illustrative embodiment. Operation begins (block 600), and the mechanism receives a query (block 601). The mechanism transforms the query into a plurality of transformed, general-domain queries (block 602). The mechanism may transform the query by passing the query unmodified, reducing the query to only keywords, or concatenating context strings.

The mechanism performs a general domain search using the plurality of transformed queries (block 603). The mechanism then featurizes results of the general domain search to form a feature vector (block 604). The mechanism may featurize results by concatenating title, excerpt, host name, uniform resource locator (URL), and document content. The mechanism may also featurize the results by determining term-frequency-inverse-document-frequency (TF-IDF).

The mechanism compares each document in the specialized (narrow) domain to the feature vector to form a score (block 605). Comparison may include using a machine learning classifier that is trained with a set of training queries with corresponding ground truth labels. The machine learning classifier may predict whether an input feature vector has a given label. Other techniques for comparison, classification, and/or scoring may be used within the spirit and scope of the illustrative embodiments.

The mechanism then ranks documents in the specialized domain by score and generates a result set (block 606). The mechanism then presents the result set to the user (block 607). Thereafter, operation ends.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and a memory, the memory comprising instructions that are executed by the at least one processor to specifically configure the processor to implement a specialized-domain search engine with domain transfer, the method comprising:

receiving, by the specialized-domain search engine executing on the at least one processor of the data processing system, an input query to search a narrow domain corpus of documents from a user;

performing, by the specialized-domain search engine, a general-domain search based on the input query to generate a set of general-domain results, wherein performing the general-domain search comprises: transforming the input query into a plurality of general-domain queries, wherein transforming the input query further comprises splitting the input query into an original query version and a keyword-only version and concatenating each of a plurality of context strings to the original query version and to the keyword-only version, wherein the plurality of context strings are relevant to the narrow domain corpus of documents; sending the plurality of general-domain queries to a plurality of instances of a general-domain search engine in parallel, wherein the plurality of instances of the general-domain search engine search a general domain corpus of documents based on the plurality of general-domain queries; and receiving the set of general-domain results from the plurality of instances of the general-domain search engine with respect to a general domain corpus of documents;

generating, by a featurizer component executing within the specialized-domain search engine, a feature vector based on the set of general-domain results, wherein generating the feature vector comprises generating a sub-vector for each of the plurality of general-domain queries and concatenating sub-vectors for the plurality of general-domain queries to form the feature vector, wherein each sub-vector comprises the input query with a different set of features masked off;

generating, by a classifier component executing within the specialized-domain search engine, a score for each document within the narrow domain corpus of documents by comparing the feature vector to each document within the narrow domain corpus of documents;

generating, by the specialized-domain search engine, a ranked result set of documents from the narrow domain corpus of documents based on the scores of the documents in the narrow domain corpus of documents; and presenting, by the specialized-domain search engine, the ranked result set of documents to the user.

2. The method of claim 1, wherein generating the feature vector comprises:

concatenating titles and snippets from the general domain search results for each of the plurality of general-domain queries to form a text string;

computing term frequency (TF) for each text string; and computing inverse document frequency (IDF) across a collection of the text strings for the plurality of general-domain queries;

forming a plurality of TF-IDF sub-vectors based on the term frequencies of the text strings and the inverse document frequency for the plurality of general-domain queries; and generating the feature vector by concatenating the plurality of TF-IDF sub-vectors.

3. The method of claim 1, wherein generating the feature vector comprises concatenating title and snippets from the general-domain results into a text string.

4. The method of claim 1, wherein the narrow domain corpus of documents comprises email documents of a user or a web site of a company.

5. The method of claim 1, wherein comparing the feature vector to each document within the narrow domain corpus of documents comprises applying a machine learning classifier.

6. The method of claim 5, wherein the machine learning classifier is trained using a training set of queries and corresponding ground truth document labels.

7. The method of claim 5, wherein comparing the feature vector to each document within the narrow domain corpus of documents further comprises using each sub-vector to train a classifier to form a set of classifiers and compute a similarity score for the document based on the feature vector using the set of classifiers in an ensemble learning scheme.

* * * * *